Feb. 28, 1939. G. TOMSIC 2,148,788
HYDRAULIC SADDLE
Filed March 5, 1938
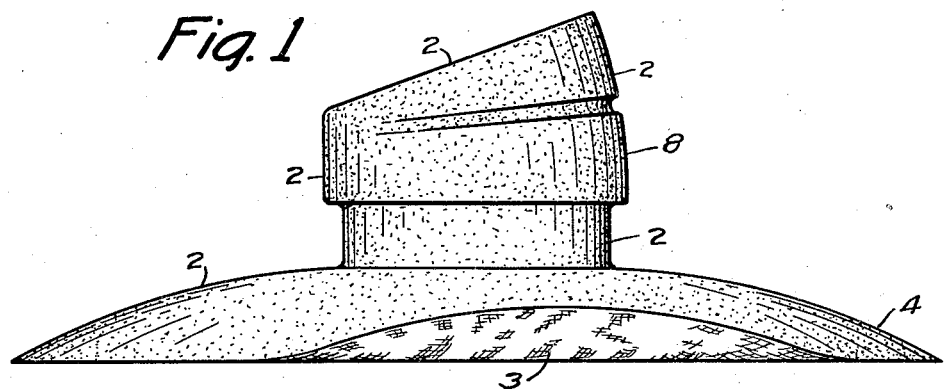
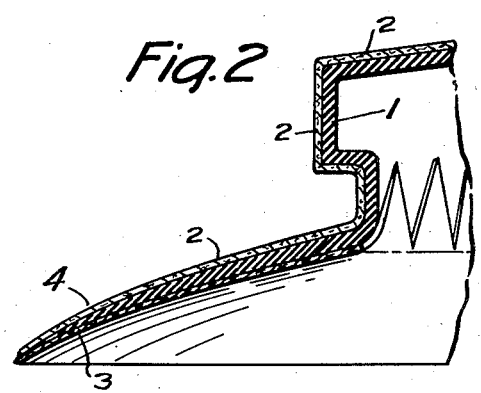
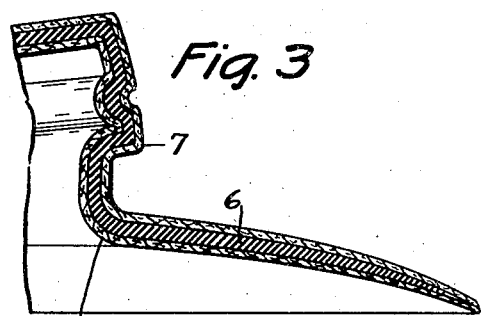
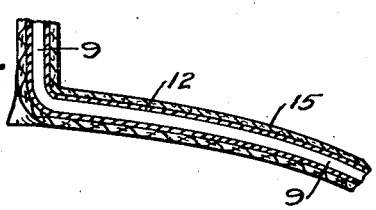
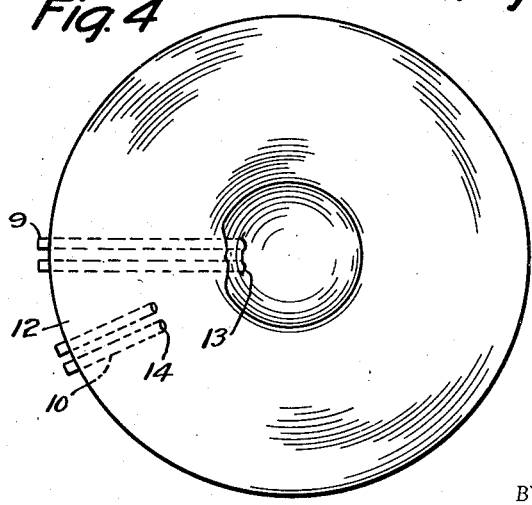
INVENTOR.
Guy Tomsic
BY James Harrison Bowen
ATTORNEY.

Patented Feb. 28, 1939

2,148,788

UNITED STATES PATENT OFFICE 2,148,788

HYDRAULIC SADDLE

Guy Tomsic, Oceanside, N. Y.

Application March 5, 1938, Serial No. 194,181

3 Claims. (Cl. 223—13)

The purpose of this invention is to improve forms, blocks, or devices upon which hats are formed, which are commonly known as saddles, by covering the foundation material with a material that will not wear at the corners, and that will last the entire life of the saddle, and also to improve the means for relieving the vacuum between the saddle and pressure applying means.

The invention is a hydraulic saddle upon which hats are formed which uses a relatively heavy layer of rubber as a foundation material, and protects the rubber on the under side with a layer of canvas, and on the upper side, upon which the hat is formed, with a continuous layer of wool felt protecting the hat material from the rubber, and a relatively heavy rubber tubing in the rubber foundation material of the saddle extending from the edge of the brim to the crown and to points in the brim.

Saddles of this type, and substantially of the same construction, have been in use in the millinery trade for twenty five to thirty years, however, these saddles are generally formed with a foundation layer of rubber, and this is covered with canvas or felt, however, felt has only been used on the brim, and the canvas covering the crown wears off, particularly at the edges or corners, and in many cases the rubber edges are exposed after the first hat is formed thereon, and the high temperature causes the exposed rubber to be vulcanized to the inner surface of the hat so that it is difficult to remove the hat from the form, and often requires cleaning after it is removed, whereas, by covering the crown with felt, and particularly wool felt, the felt wears indefinitely and does not wear off at the corners even at high temperatures, so that the rubber is protected from the heat, and its life is, therefore, much longer, and, at the same time, the rubber does not come into contact with the hat material, and the hat may be very easily removed therefrom. Another essential feature in removing hats from saddles of this type is in the fact that the rubber bag or pressure form fills the entire interior of the crown, and, when the pressure is released, it is difficult to relieve the vacuum. An attempt has been made to convey air to the interior of the crown by a corrugated strip of rubber vulcanized to the surface of the saddle, however, it will be noted in many saddles now in use that these strips of corrugated material, or with holes extending therethrough, have been multiplied by placing similar strips at several points, and they have even been placed across the interior of the crown because the pressure of the rubber bag flattens the strips, and thereby fills the openings so that it has been found necessary to form these openings through the inner rubber foundation layer of material instead of on the surface of the saddle.

One object of this invention is, therefore, to improve saddles for forming hats of this type by completely covering the surface of the crown which engages the material of the hat with a material capable of absorbing moisture and heat, and which acts as an insulator for the rubber foundation.

Another object is to provide a suitable covering for crowns of hat saddles which has sufficient stability or toughness to remain on the corners or sharp edges.

Another object is to provide a suitable covering for crowns of hat saddles which does not adhere to the material of the hat.

Another object is to provide a saddle for hats and the like in which the foundation material is protected by a protective covering extending substantially continuous over the inner and outer surfaces.

Another object is to provide a vent for saddles which is formed in the foundation layer so that it will not close by pressure.

A further object is to provide means for relieving the vacuum on the inner surface of a saddle for forming hats which may be built into the saddle.

And a still further object is to provide a hydraulic saddle of the type used for forming hats in which the foundation material of the crown is positively protected, and also in which means is provided for positively relieving a vacuum on the inside of the crown.

With these ends in view the invention embodies a saddle for hats and the like comprising a foundation member preferably of rubber, a layer of canvas substantially covering the under surface thereof, a layer of felt completely covering the upper surface, or the surface that engages the hat, covering both the crown and brim, and vents in the foundation member extending from the edge of the brim to the inner portion of the crown.

Other features and advantages of the invention will appear from the following description taken in connection with the drawing, wherein:

Figure 1 is a view showing a typical saddle with the edge turned up showing a fabric covering on the under surface.

Figure 2 is a section through a portion of a saddle, showing the relative thicknesses of the material exaggerated for the purpose of illustration.

Figure 3 is a similar view showing an alternate design in which the layer of fabric on the under surface extends continuously through the inside of the crown.

Figure 4 is a plan view showing the under surface of the saddle with vent tubes extending therethrough.

Figure 5 is a detail showing a section through a portion of the saddle, showing the arrangement of the vent tubes.

Figure 6 is a cross section through a portion of the saddle, showing a section through the vent tubes.

In the drawing the saddle is shown as it may be made, although it will be understood that only one design of saddle is illustrated, and these saddles are formed in different designs for forming hats of various designs. However, in the design shown, the saddle is formed with a foundation layer of rubber, as indicated by the numeral 1, a complete covering of felt, as indicated by the numeral 2, and a covering of canvas on the under surface, as indicated by the numeral 3.

The canvas is shown extending only over the under surface of the brim portion 4, with the edges thereof extending upward into the crown in Figure 2, and it will be understood that this layer of canvas may also extend upward forming a complete covering for the inner surface of the crown, as shown in Figure 3, in which the canvas is indicated by the numeral 5, the rubber by the numeral 6, and the felt by the numeral 7.

In the design illustrated in Figure 1, the crown portion is indicated by the numeral 8, and it will be understood that a continuous layer of felt 2 completely covers the crown and also the brim 4, and, although this material is indicated as wool felt, it will be understood that any suitable material may be used.

Heretofore this crown portion has been covered with a thin layer of canvas, and when this is vulcanized to the rubber it merely forms a binder, and, as it has been found very difficult to shape the canvas over the corners or edges of an odd shaped crown, these edges are very often uncovered so that the rubber is exposed, and, as the high temperature causes the rubber to vulcanize, it adheres to the hat and makes it very difficult to remove the form, whereas, with these edges completely covered by a relatively heavy layer of wool felt, the felt not only functions as an insulator protecting the rubber from the heat, but absolutely prevents any contact whatever between the rubber and the hat material.

The space inside of the crown is filled with a rubber bag containing water, or a suitable fluid, and, when this is enclosed in the machine, pressure is applied to the water so that it completely fills the area in the crown, and the pressure forces the material of the saddle against the material of the hat, thereby shaping the hat material over a metallic form into which the device is inserted generally in an inverted position.

With the crown particularly as shown in Figures 2 and 3 air may be trapped on the inside, and any air pockets hold the material of the rubber bag away from the saddle, so that it is absolutely necessary to provide vents permitting the escape of the air, and also permitting air to enter the crown and the area between the brim and bag after the hat is formed, and as the rubber bag is removed, and, whereas grooves have been placed on the surface of the saddle, they are exposed to the pressure and are flattened thereby, so that, in this device, relatively hard rubber tubes 9 and 10 are embedded in the foundation layer of rubber, and these tubes are provided with relatively small openings 11. The tubes 9 extend from the outer edge of the saddle 12, shown in Figure 4, to points 13 on the inside of the crown, extending continuously through the brim and downward into the crown, as also shown in Figure 5. The tubes 10 are somewhat shorter and extend from the outer edge of the brim to points 14, about midway thereof, and it will be understood that these tubes may be positioned at other points in the brim if desired, to permit the escape of air, and to relieve the vacuum at any point or points. In this design the outer covering of felt is indicated by the numeral 15.

In the design shown in Figure 6, the tubes are shown covered with rubber on both sides, however, these may be positioned directly under the canvas, or may be embedded in the rubber in any manner. It will be noted that, in forming the saddle, the canvas and felt are vulcanized to the rubber, so that, with these tubes in place, the openings therein would be closed by the vulcanizing process, so that in manufacturing the saddles it is necessary to place waxed metal rods or wires through the tubes, and, after the complete saddle is formed, these wires may be withdrawn. These saddles have also been formed by inserting rods of a soft metal in place of the entire rubber tubes, and, after the saddle is vulcanized, these rods are withdrawn and the tubes inserted.

It will be appreciated, therefore, that the tubes may be embedded in the saddle in any manner or by any means. It will also be understood that any number of tubes may be used, and these may be located at any point or points throughout the brim and crown, and openings may be provided to permit the escape of air or to relieve the vacuum at any point or points.

It will be understood that other changes may be made in the saddle without departing from the spirit of the invention. One of which changes may be in the use of a saddle of any other shape or design, another may be in the use of any other material in place of the felt by which the foundation material may be completely covered and insulated, and still another may be in the use of any other material on the under side of the saddle.

The construction will be readily understood from the foregoing description. In use the saddle may be formed as shown and described, and, with saddles formed in this manner, the material of the hat may be placed over the saddle, and the saddle may then be inverted and placed in the hydraulic machine so that, when the pressure is applied, the air in the crown will be immediately forced out, and the material of the hat will be readily shaped or formed. The saddle and hat may then be removed from the machine, and, as the material of the hat is absolutely protected from the rubber of the saddle, it may readily be removed therefrom, and, as the rubber of the saddle is completely covered and protected by a substantial layer of wool felt, the heat used in forming the hat will not penetrate to the rubber, or, at least, will be restricted so that the rubber will be insulated from the extreme heat. The life of the rubber is, therefore, materially extended, and, at the same time, the material of the hat is protected therefrom.

Having thus fully described the invention, what

I claim as new, and desire to secure by Letters Patent, is:

1. A hat saddle comprising a foundation layer of rubber or the like, a canvas covering on the underside of the said layer of rubber, a felt covering extending continuously over the upper surface of the crown and brim portions of the said layer of rubber, and air escape tubes extending from the outer edge of the brim portion of the saddle to the interior of the crown and opening into the said interior, said tubes embedded in the said foundation layer of rubber or the like.

2. A saddle for forming hats or the like having a crown and brim, characterized in that the foundation material of the crown is completely covered on the surface that normally engages the hat with a layer of absorbent and protective material, and air escape tubes embedded in the said foundation material extending from the outer edge of the brim to the crown.

3. A saddle, as described in claim 2, in which the said air escape tubes also extend to points intermediate of the brim.

GUY TOMSIC.